Aug. 21, 1945.   J. DE STEFANO   2,383,294
SEA WATER DISTILLING DEVICE
Filed July 8, 1943   2 Sheets-Sheet 1
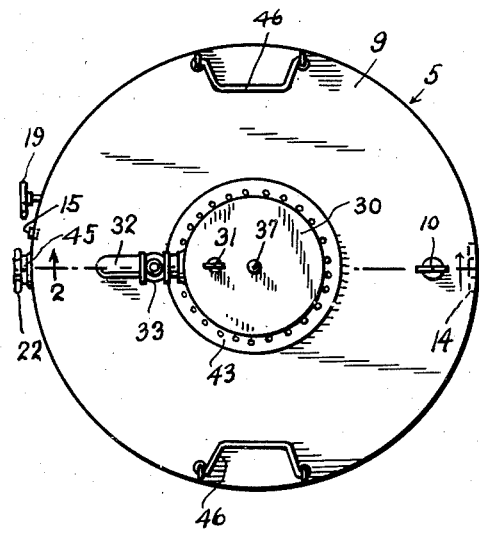
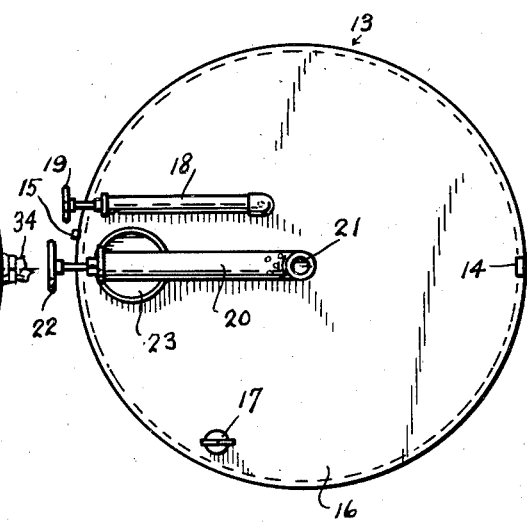
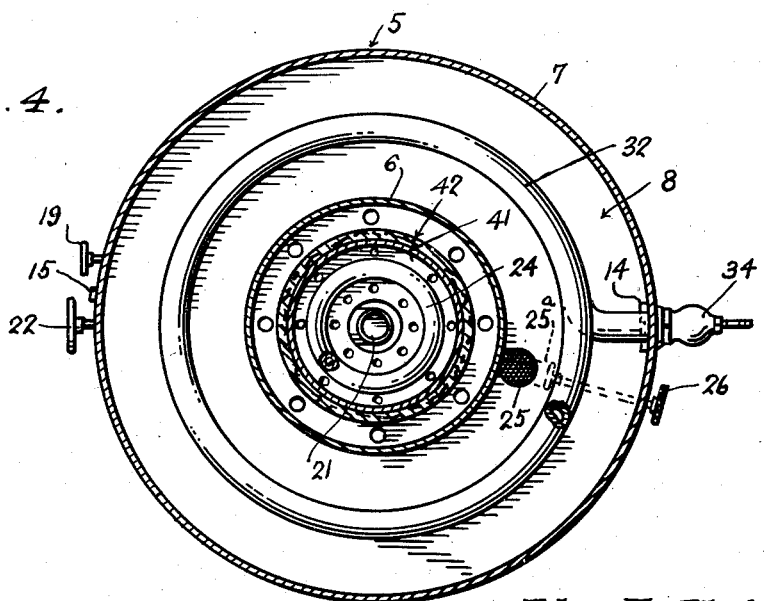
Inventor
John De Stefano
By Clarence A. O'Brien
and Harvey B. Jacobson
Attorneys Aug. 21, 1945.   J. DE STEFANO   2,383,294
SEA WATER DISTILLING DEVICE
Filed July 8, 1943   2 Sheets-Sheet 2

Inventor
John DeStefano

By Clarence A. O'Brien
and Harvey B. Jacobson
Attorneys

Patented Aug. 21, 1945

2,383,294

UNITED STATES PATENT OFFICE 2,383,294

SEA WATER DISTILLING DEVICE

John De Stefano, Jackson Heights, N. Y.

Application July 8, 1943, Serial No. 493,909

6 Claims. (Cl. 202—180)

The present invention relates to a novel and improved device which is expressly, though not necessarily, adapted for distilling salty sea water, whereby to thus condition it for palatable as well as safe human consumption.

Present-day war and attending emergency conditions have made it necessary to provide aeroplanes and rafts and lifeboats with suitable drinking water supply devices. No doubt, various make-shift and perhaps some practicable devices and accessories have been brought into use. To the best of my knowledge and belief, there is nevertheless a need for a portable easy to handle and use water distilling device, and, with this in mind, I have evolved and produced a structure which, it is believed, satisfactorily fulfills the requirements of the trade and users in general.

I am not unmindful that water distilling apparatuses are not, obviously new. At the same time, and despite sincere research work, I was unable to find one which would aptly comply with those requirements which I believe to be necessary in producing an acceptable and practicable structure for the particular purposes stated. Therefore, and in keeping with my aims, I have brought into being, and have used experimentally, a novel and improved structure embodying those features and advantages I consider essential in a portable emergency type water purifier.

In carrying out the preferred embodiment of the instant invention, I found it expedient and practicable to employ a simple handle-equipped portable tank, this having an appropriate readily usable heating device, condensing coils and heating coils, all of said parts having been carefully chosen and structurally coordinated to contribute their proportionate shares in the production of a safe and sane distiller for drinking water.

Other features and advantages will become more readily apparent from the following description and the accompanying illustrative drawings.

In the drawings, wherein like numerals are employed to designate like parts throughout the views:

Figure 1 is a top plan view of a salty sea water distiller constructed in accordance with the principles of the present inventive conception.

Figure 3 is a top plan view of the alcohol heating unit.

Figure 4 is a cross-section on the plane of the line 4—4 of Figure 2, looking downwardly in the direction of the arrows.

Figure 2:
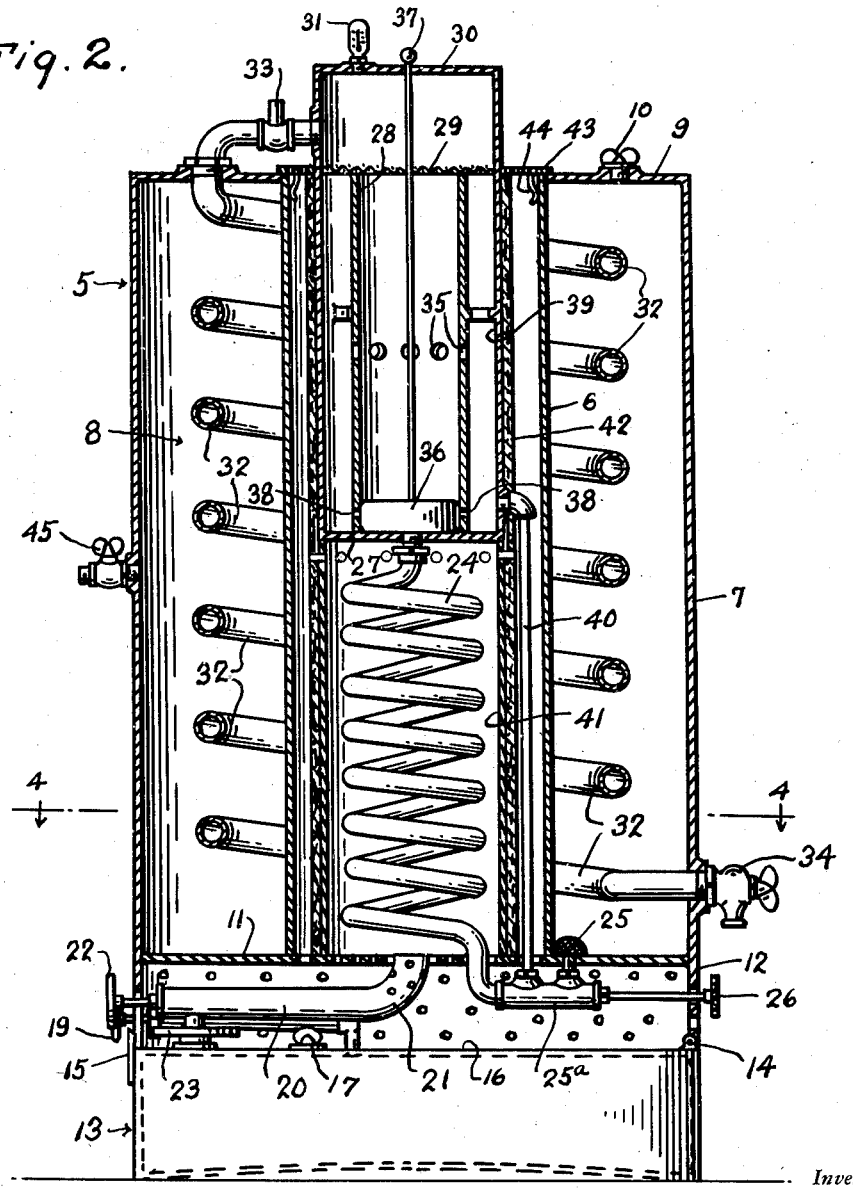
Figure 2 is an enlarged central vertical sectional view, with parts in elevation, the section being taken on the plane of the line 2—2 of Figure 1, looking in the direction of the arrows.

Referring now to the drawings by distinguishing reference numerals it will be observed that the main tank, which is of appropriate materials and dimensions, is denoted by the numeral 5. It is of general cylindrical construction and includes spaced parallel inner and outer cylindrical walls 6 and 7 defining a coil and water accommodation compartment 8. Mounted in the top 9 is an appropriate plug 10 to facilitate filling said space or compartment 8 with salt or equivalent sea water. Depending below the bottom 11 is an apertured skirt 12 of annular form and an alcohol burner unit 13 is hingedly mounted thereon as at 14. A latch 15 on a diametrically opposite side serves to clamp and hold the burner in useful position. Incidentally, the burner 13 comprises an appropriate tank 16 (see Figure 3) having a fuel filler plug 17. The top wall of the tank is provided with a suitable pressure pump 18 provided with a plunger 19. A manifold 20 having an upturned suitably apertured flame discharge nozzle 21 is appropriately mounted on and attached to the top of said tank 16. At the valved end 22 is a priming pan 23.

The cylindrical wall 6 defines a chamber to accommodate the water heating and elevating means. This means comprises a vertical coil 24 of appropriate dimensions, said coil being connected at its lower end to a valve casing 25a having a suitable valve (not shown) controlled by the operating knob or handle 26. Water from the chamber or space 8 enters the valve casing by way of an appropriately screen inlet connection 25. The upper end of the coil 24 is connected to the bottom 27 of the auxiliary tank, this being supported in the upper portion of said chamber. On the interior of the tank just referred to is a cylinder 28 having a screen 29 at its top defining what may be conveniently designated as a steam dome 30. The dome is provided with a suitable pressure gauge 31. The upper end portion of the condensing coil 32 is connected with the steam dome by way of a suitable pressure blow-off valve 33. The convolutions of the coil 32 extend downwardly so that the condensed products flow by gravity down to the lowermost coil and out through the pet-cock 34 for use. The cylinder 28 is provided intermediate its ends with steam orifices or ports 35. There is a float 36 in said cylinder, the stem of the float extending upwardly through the dome 30 and terminating in an indicator ball or the like 37. Suitable small ports 38 are formed in the lower portion of the wall of the cylinder 28 and communicate with the surrounding cylinder 39. A return pipe 40 of relatively small diameter is connected with the cylinder 39 and extends downwardly and is also connected with the valved casing 26 as brought out to advantage in Figure 2. A sleeve 41 of sheet metal or the like surrounds the heating coil 24 and rests on the bottom of the main tank 7. At its upper end it is suitably connected with the bottom of the steam pressure tank 39. A jacket of asbestos or the like 42 surrounds the sleeve 41 and also the steam tank 39. The numeral 43 designates an annular apertured venting collar which surrounds the steam dome and rests upon the top 9 of the main tank, this having retention fingers or clips 44 to hold it removably in position. This is merely a cover for the draft space existing between the tank 39, adjacent parts and wall 6. It can be slid up on the dome 30 when the clips 44 are disengaged to permit access to be had to said space.

The operation and use of the device is as follows:

Sea water is placed in the tank 5 by way of a suitable filler means 10. Then, when the valve in the casing 25 is opened by way of the handle 26, the sea water simply flows down through the filtering screen 25 and on up through the coil 24 and charges the boiler and steam generating tank 39 to such level as is desired, this as indicated on the sight gauge 37. Then, after the boiler is all set for use, the valve 26 is closed. Should the valve 26 be left open, the water would then seek the elevation as determined by the elevation of water in the main tank 5. This would, however, limit the space in the steam dome 30. The maximum output of distillate is obtained when the generating tank is approximately three quarters filled with water and "full" as indicated by the sight gauge. If the amount of water taken from tank 5 is such as to diminish the cooling capacity of the water which is left in said tank 5, a limited additional supply of water can, of course, be placed in the tank. Or, if the water in tank 5 becomes heated as to diminish the cooling capacity of condensing coils 32, water in tank 5 can be drained to level of valve 45 and tank 5 can be refilled.

After the burner is turned on, the heat impinges against the coils of the heating coil 24 and this starts the boiler to work heating the water, circulating it back and forth through the chambers defined in the cylinder 28, tank 39, pipe 40 and heating coil 24. The water level in the cylinder 28 and surrounding tank 39 is usually high enough to push the float 36 above the ports 35 which offer the necessary communication between the float chamber and the surrounding water space in said tank 39. Thus, we have here a simple boiler which generates steam and the steam passes on up and is collected in the dome 30 formed by the upper protruding end as seen in Figure 2. The steam in steam dome 30 passes through condensing coils 32, being cooled by the water in tank 5, and the distillate is collected by way of the valve 34 which is provided therefor. To blow-out steam generator unit: Close valve 34 when steam starts to escape from pop-off valve 33. Then open valve 26 the steam pressure in dome 30 forces the brine or water, or both through coil 24 and into tank 5. Note tank 5 is vented at filler cap 10. The brine becomes diluted in the greater amount of water in tank 5. When sight gauge indicates "empty" or nearly empty, refill rank 39. To refill tank 39:

Open valve 34 water will flow into tank 39, when the water reaches the desired level as per indication on sight gauge, close valve 26. From this point the tank is in operation.

It will be noted that pipe 40 is important to the operation of this unit, as its function and purpose is to facilitate circulation of water between tank 39 through coil 24. With out pipe 40 there would be no circulation and coil 24 could burn, say due to air lock or lack of water in the line. Therefore, with pipe 40 connected to coil 24 and into tank 39 we have a complete cycle.

It is believed that a distilling apparatus of the type described may be provided with suitable hand grips 46 as shown in Figure 1 and readily carried from place to place, thus making it useful as an emergency device in lifeboats, or rafts, or in aeroplanes, or in fact wherever it is found necessary to convert otherwise undrinkable water into that which can be safely consumed by humans. It is unnecessary, however, to go into the commercial aspects of the invention here.

Although I have described and shown the heating device as a so-called "alcohol" stove or burner unit 13, it is to be understood that the expression "alcohol" is not intended to be a needless limitation. This is on the assumption that any equivalent heating device of corresponding construction operable by other fuels such as gasoline or kerosene will suffice. I desire the claims interpreted accordingly.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having described the invention, what is claimed as new is:

1. An emergency type sea water distilling device of a portable type suitable for use in connection with rafts, lifeboats, landing barges and the like comprising an annular water receiving, storing and supply tank embodying inner and outer spaced parallel walls of corresponding lengths adjoined by flat top and bottom walls, said tank being provided at its bottom with a depending annular apertured skirt defining a heat trapping chamber, a disc-like burner hingedly mounted on and coacting with the lower edge of said skirt to serve as a closure for the skirt as well as a base for the complete device, a steam condensing coil in the water space between said inner and outer walls, the lower end of said coil opening through the bottom portion of the outer wall and being provided with a distilled water delivery valve, the upper end of the coil extending through said top wall, and a bodily insertable and removable water holding and steam generating unit disposed in concentric spaced relation in the flue-like chamber defined by said inner wall, said unit including an auxiliary limited capacity tank and a water feeding and heating coil, the lower end of the coil being positioned for coaction with the burner, and the upper protruding end of said condensing coil being connected with the upper portion of the auxiliary tank.

2. A small type readily portable sea water distiller for emergency use in connection with rafts, lifeboats, airplanes and the like comprising a main annular tank for storing water including interconnected inner and outer cylindrical walls disposed in spaced parallelism and defining a water reserve and condensing coil space between themselves, said inner wall also functioning to define a cylindrical flue-like chamber, a condensing coil mounted in said water space and having its lower end opening through the lower portion of said outer cylindrical wall and provided with a distilled water discharge cock, the upper end of said condensing coil extending above the top of said main tank, a readily insertable and removable unit located in said flue-like chamber and comprising a perpendicular water holding and heating coil disposed in the lower portion of said chamber and including a valve having communicating connection with the bottom of said main tank, an auxiliary water boiling and steam supply tank of relatively small dimension connected to the upper end of said coil and located in the upper portion of said chamber and projecting above the top of said main tank, the upper end of said condensing coil being connected with the projecting upper end portion of said auxiliary tank, said auxiliary tank being spaced from said inner wall to define a duct for air venting and circulation purposes, an apertured ring-like collar surrounding the upper protruding end of said auxiliary tank and resting on the top of the main tank and closing the upper end of said duct, and a burner supported on the bottom of the main tank and coacting with said water heating coil in the manner and for the purposes described.

3. As a component part of a portable sea water distilling device of the class described, a readily applicable and removable insert unit comprising an auxiliary tank, a water heating coil attached to the bottom of said tank, a cylinder arranged concentrically in said auxiliary tank and having its upper end spaced considerably below the upper closed end of said tank, the upper end of said cylinder being open, said cylinder being also provided with apertures and the upper end thereof being closed by a spanning screen, a float slidably mounted in said cylinder, said float including a stem extending slidably up through the top of said tank, and an apertured collar embracing the upper portion of the auxiliary tank and provided with attaching clips usable in the manner and for the purposes described.

4. As a component part of a portable sea water distilling device of the class described, a readily insertable and removable steam boiler unit comprising a relatively small tank, a water delivery, return and heating coil attached to the bottom of said tank, a cylindrical baffle arranged concentrically in and spaced from the wall of the tank and having its upper end terminating considerably below the closed upper end of said tank, the upper end of said cylindrical baffle being open, said cylindrical baffle being also provided with water surging and circulating apertures and the upper end being provided with a screen, said screen attached to said tank, a float slidably mounted in said cylindrical baffle, said float including a water level indicator stem extending slidably up through the top of said tank.

5. As a component part of a portable sea water distilling device of the class described, a readily insertable and removable steam boiler unit comprising a relatively small tank, a water delivery, return and heating coil attached to the bottom of said tank, a cylindrical baffle arranged concentrically in and spaced from the wall of the tank and having its upper end terminating considerably below the closed upper end of said tank, the upper end of said cylindrical baffle being open, said cylindrical baffle being also provided with water surging and circulating apertures and the upper end being provided with a screen, said screen attached to said tank, a float slidably mounted in said cylindrical baffle, said float including a water level indicator stem extending slidably up through the top of said tank, and a water return and circulating pipe connected to the bottom of said tank and extending down and connected to the lower portion of said coil.

6. As a component part of a portable sea water distilling device of the class described, a readily insertable and removable steam boiler unit comprising a relatively small tank, a water delivery, return and heating coil attached to the bottom of said tank, a cylindrical baffle arranged concentrically in and spaced from the wall of the tank and having its upper end terminating considerably below the closed upper end of said tank, the upper end of said cylindrical baffle being open, said cylindrical baffle being also provided with water surging and circulating apertures and the upper end being provided with a screen, said screen attached to said tank, a float slidably mounted in said cylindrical baffle, said float including a water level indicator stem extending slidably up through the top of said tank, a water return and circulating pipe connected to the bottom of said tank and extending down and connected to the lower portion of said coil, and a hand regulated valve at the intake end of the lowermost convolution of said heating coil, said valve being adapted for connection to the bottom of a water supply tank.

JOHN DE STEFANO.